United States Patent
Bach

(10) Patent No.: US 6,296,924 B1
(45) Date of Patent: Oct. 2, 2001

(54) SYSTEM PERFORATED CELL CONFINEMENT

(75) Inventor: Gary M. Bach, Appleton, WI (US)

(73) Assignee: Reynolds Consumer Products, Inc., Richmond, VA (US)

( * ) Notice: Subject to any disclaimer, the term of this patent is extended or adjusted under 35 U.S.C. 154(b) by 677 days.

(21) Appl. No.: 08/548,365

(22) Filed: Nov. 1, 1995

(51) Int. Cl.[7] .................................................. B32B 3/24
(52) U.S. Cl. .................... 428/137; 428/116; 428/117; 428/99; 428/198; 428/223; 405/15; 405/16; 405/18; 405/19; 405/258.1
(58) Field of Search .................... 428/137, 116, 428/117, 99, 198, 223; 405/15, 16, 18, 19, 258.1

(56) References Cited

U.S. PATENT DOCUMENTS

| | | | |
|---|---|---|---|
| 4,530,622 | 7/1985 | Mercer | 405/258 |
| 4,647,325 | * 3/1987 | Bach | 156/73.1 |
| 4,717,283 | * 1/1988 | Bach | 405/17 |
| 4,778,309 | * 10/1988 | Bach et al. | 405/258 |
| 4,804,293 | 2/1989 | Várkonyi et al. | 405/15 |
| 4,965,097 | 10/1990 | Bach | 428/194 |
| 5,449,543 | * 9/1995 | Bach et al. | 428/117 |

FOREIGN PATENT DOCUMENTS

| | | | |
|---|---|---|---|
| 56016730 | 2/1981 | (JP) | 405/258 |
| 57003923 | 1/1982 | (JP) | 405/258 |
| 58101932 | 6/1983 | (JP) | 405/258 |
| 58106020 | 6/1983 | (JP) | 405/258 |
| 58131228 | 8/1983 | (JP) | 405/258 |
| 63151712 | 6/1988 | (JP) | 405/258 |

OTHER PUBLICATIONS

Walls, James C., Results of Direct Shearbox Tests on Perforated Geoweb® Reinformcement with Corse Sand, Feb., 1993.

Walls, James C., Results of Large–scale Shearbox Tests on Perforated Geoweb® Reinforcement with Crushed Limestone, Mar., 1993.

* cited by examiner

Primary Examiner—William P. Watkins, III

(57) ABSTRACT

A cell confinement structure for confinement of material having a plurality of elongated plastic strips in a side by side relationship bonded together in spaced-apart, limited areas where the plurality of strips are capable of being stretched in width to form a unitary web of cells. The strips forming walls of the cells with at least one of the cell walls having a plurality of apertures in which each diameter is between about 3 mm and 17 mm. Preferably, each of the cell walls has a plurality of apertures with the total area of the apertures in the cell walls being between 19% and 28% of cell wall area. The sell structure may include tendons passing through the walls of the cell.

6 Claims, 3 Drawing Sheets

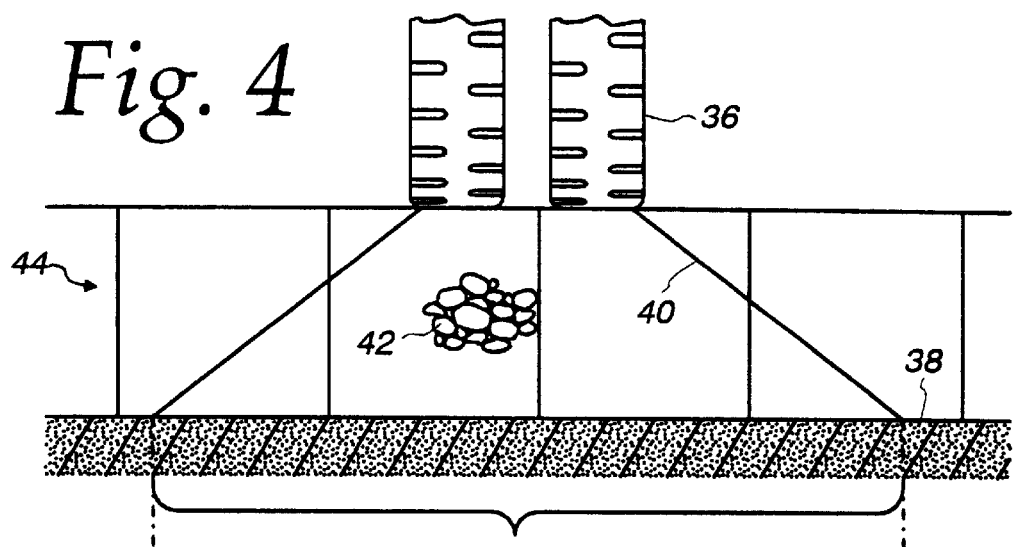
*Fig. 4*
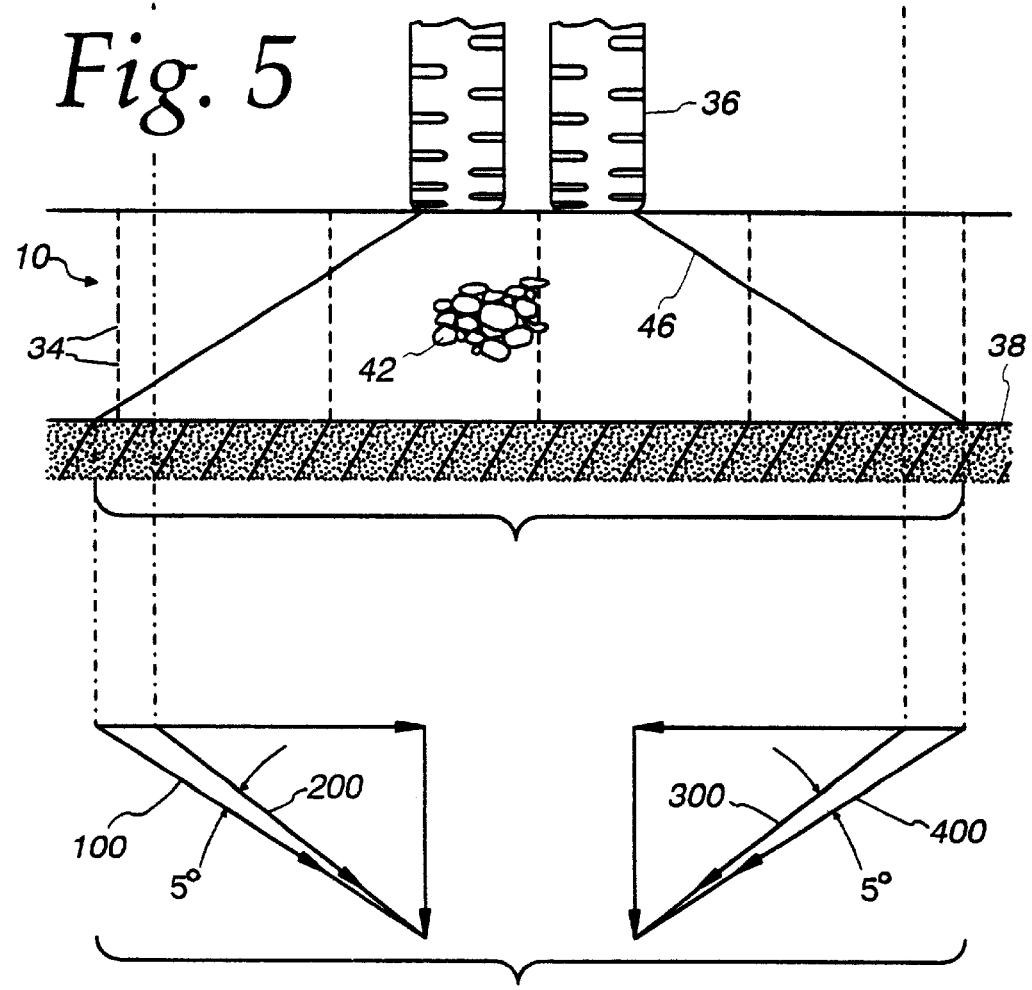
*Fig. 5*
*Fig. 6*

SYSTEM PERFORATED CELL CONFINEMENT

FIELD OF THE INVENTION

The present invention relates to a reinforced cell structure for confinement of material. Specifically, the present invention relates to a cell web material which has apertures that increase the load bearing capacity by improving the interface frictional angle.

BACKGROUND OF THE INVENTION

Cellular confinement structures serve to increase the load bearing capacity, stability and erosion resistance of materials which are placed within the cells of the system. A commercially available system is Geowebe plastic web soil confinement structure, sold by Presto Products, Incorporated, P.O. Box 2399, Appleton, Wis. 54913. Geoweb® cells are made from high density polyethylene strips which are joined by ultrasonic seams on their faces in a side by side relationship at alternating spacings so that when the strips are stretched out in a direction perpendicular to the faces of the strips, the resulting web section is honeycomb-like in appearance, with sinusoidal or undulant shaped cells. Geoweb® sections are light-weight and are shipped in their collapsed form for ease in handling and installation.

The web materials have been used extensively to provide road bases, subgrades or pavement systems. Structural foundations have been reinforced or stiffened with the web materials. Additionally, Geoweb® cells have been used to provide earth and liquid retention structures by stacking one web layer upon another, such as a stepped back design for hill slope retention. The Geoweb® cells also protect earth slopes, channels, revetments and hydraulic structures from surface erosion. Grass and other earth slope cover materials have been protected and stabilized through the use of the web cells.

Geoweb® cells can be infilled with various earth materials such as sand, rounded rock, granular soils and aggregates, topsoil, vegetative materials and the like. Concrete and soil-cement or asphaltic-cement can also be used to infill the cells.

Materials, such as stone, are ideal for construction because of their very high internal friction angles. The drawback with these construction materials are the lack of cohesion factors which result in the need to confine the materials. A cellular confinement structure, such as Geoweb®, provides a cohesive factor by confining the materials, but does not provide the same friction angle because the confinement structure introduces a slip plane in which the stone has a lower interface friction angle. Therefore, the stone does not perform at its internal friction angle. If the interface friction angle can be increased, the load bearing capacity will also be increased.

An improvement in the load bearing capacity can result in stronger structural designs with higher factors of safety and more cost effective designs for civil engineering applications such as in road base or retaining wall designs. Load bearing capacity has been increased in a texturized cell material structure using a sand infill by the improvement of this interface friction angle. U.S. Pat. No. 4,965,097. However, the texturized cell wall does not perform as well in increasing the interface friction angle on larger construction materials, such as stone.

There is a need in the industry for a cell confinement structure that significantly improves load bearing capacity on construction materials, such as stone, by increasing the interface friction angle, while still maintaining the strength of the cellular confinement structure.

SUMMARY OF THE INVENTION

The present invention addresses the need to effectively provide an improved cellular web structure that increases the interface friction angle in construction materials such as stone. The result of improving the interface friction angle is an increase in the load bearing capacity of the cellular confinement structure.

Other important objectives obtained with this improved cellular web structure are as follows: a weight reduction of the cellular confinement structure- which is especially useful on weaker subgrades; lateral drainage through the system which improves structure integrity; lock up of concrete infill and open areas for use with tendons reinforcements.

The present invention provides a cell structure for confinement of material having many elongated plastic strips in a side by side relationship that are bonded together in spaced apart, limited areas in which the strips may be stretched in width to form a unitary web of cells. The strips form cell walls that have a plurality of apertures whose diameter can range between about 3 mm and about 17 mm.

In a preferred embodiment, each of the cell walls has many apertures. If aesthetics is a concern, a non-aperture cell wall can be bonded with open cell walls. The diameters of the apertures in the cell walls are approximately 10 mm with the area of the apertures comprising approximately 19 to 28% of the total area of the cell wall surface. The plurality of apertures increases the interface friction angle by approximately 5 degrees compared to a cellular confinement structure without a plurality of apertures. The apertures are aligned in staggered rows to maintain the hoop/column strength of the web structure.

In another embodiment, the cell walls have a plurality of apertures that are described in the preferred embodiment on a texturized surface. Additionally, a reinforcing means, such as a tendon, is used through the apertures. The addition of the reinforcing tendon is independent of the existence of the texturized surface.

Another aspect of the present invention is a method for preparing material to be used as cell walls in a cellular confinement structure that improves the cohesive factor and interface friction angle. The steps in this method are forming the plurality of apertures in the plastic strips of material and providing predetermined non-open areas of the plastic strips for securement to the other plastic strips. The above method is capable of being modified by adding a tendon by finding substantially coincident apertures among the plurality of apertures, guiding the tendon through these apertures, terminating the tendon at ends of the cell web and anchoring the tendon. The tendon is added after positioning the cell web.

While the invention is susceptible to various modifications and alternative forms, specific embodiments thereof have been shown by example in the drawings and will herein be described in detail. It should be understood, however, that it is not intended to limit the invention to the particular forms disclosed, but on the contrary, the invention is to cover all modifications, equivalents and alternatives falling within the spirit and scope of the invention as defined by the appended claims.

BRIEF DESCRIPTION OF THE DRAWINGS

FIG. 4 is a sectional view showing the load bearing capacity of a cellular confinement structure with no apertures (a no open area system);

FIG. 5 is a sectional view showing the load bearing capacity of a cellular confinement structure in FIG. 1 with the plurality of apertures; and FIG. 6 is a diagrammatic view of the resulting interface friction angle increase when using a cellular confinement structure with a plurality of apertures instead of a confinement structure with no apertures.

DETAILED DESCRIPTION OF THE PREFERRED EMBODIMENT

Figure 1:
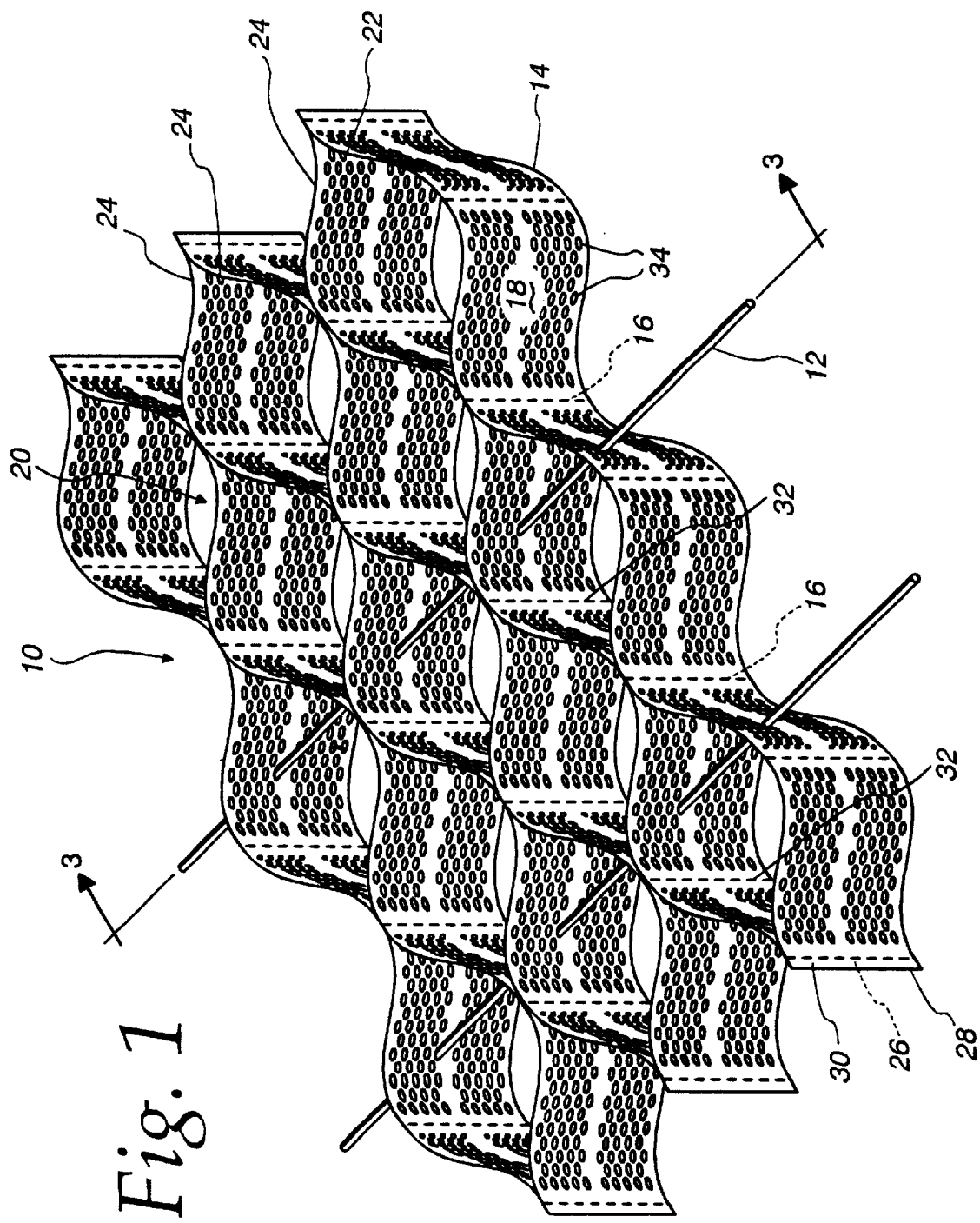
FIG. 1 is a partial perspective view of a single layer of expanded reinforced cell structure embodying the present invention.

Turning now to the drawings and referring specifically to FIG. 1, there is shown a cellular confinement structure 10 reinforced by flexible tendons 12. The cellular confinement material reinforced with tendons 12, but without a plurality of apertures 34, is described at illustrated in U.S. Pat. No. 5,449,543, issued Sep. 12, 1995, to Gary Bach and Robert Crowe which is incorporated herein by reference. The cell confinement structure 10 has a plurality of strips of plastic 14 which are bonded together, one strip to the next at alternating and equally spaced bonding areas 16 to form cell walls 18 of individual cells 20., The bonding between strips may best be described by thinking of the strips 14 as being paired, starting with an outside strip 22 paired to an outermost inside strip 24, a pair of the next two inside strips 24, etc. Each such pair is bonded at a bonding area constituting an outside weld 26 adjacent the end 28 of each strip 14. A short tail 30 between the end 28 of strip 14 and the outside weld 26 is provided to stabilize segments of the strip 14 adjacent the outside weld 26. Each pair of strips is welded together at the additional bonding areas 16, creating equal length strip segments between the outside welds 26. In addition to these welds, one strip 14 from each adjacent pair of strips 24 is also welded together at positions intermediate each of the welds in the pairs of strips, referred to hereafter as non-pair bonding areas 32. As a result, when the plurality of strips 14 are stretched in a direction perpendicular to the faces of the strips, the plastic strips bend in a sinusoidal manner and form a web of cells 20 in a repeating cell pattern. Each cell 20 of the cell web has a cell wall made from one strip and a cell wall made from a different strip.

Adjacent the bonding areas 16 and 32 are apertures 34 in the strips 14. Each tendon 12 extends through a set of apertures 34 which are substantially coincident. As used herein, the phrase "substantially coincident" means that the degree of overlap between adjacent apertures of the cell walls is greater than fifty percent, preferably greater than about 75 percent and, most preferably greater than about 90 percent. The tendons 12 reinforce the cell web and improve the stability of web installations by acting as continuous, integral anchoring members which prevent unwanted displacement of the web.

As shown in FIG. 1, the tendon 12 is preferably rectangular or oval in cross section to provide a thin profile. Tendons having a flat profile also readily fold as the tendon is inserted through the apertures 34. In order to properly reinforce the cell web and anchor fill material placed within the cells, the tendon has a tensile strength from about 100 to about 2,500 lb/in$^2$.

The number of tendons 12 present within a cell web is dependent upon the application and the tensile strength of the tendon 12. For example, shoreline installations may require only one tendon 12 attached to a cell on an end of the web to externally secure the web with an anchoring member. When tendons 12 are used to join sections of the webs, the tails of the cells at the end of one web are positioned between the tails of the cells at the end of another web. A tendon 12 is guided through a set of apertures 34 in the tails of both interlocking webs to connect the sections of webs. Concrete-filled webs typically contain two tendons 12 per cell to enable the webs to be moved, lifted and installed. Webs infilled with earth material often contain one tendon 12 per cell. For moist applications, cells of the web will include up to two tendons 12 per cell. However, if tendons having lesser tensile strength are used, such as polypropylene strapping, additional tendons would be required to reinforce each cell.

In addition to reinforcing the cell webs, the tendons 12 facilitate resistance to applied forces such as hydraulic uplift and ice action which tend to lift the cell webs. A web may be anchored to the ground at spaced intervals along the tendons 12 to prevent lifting of the web.

Figure 2:
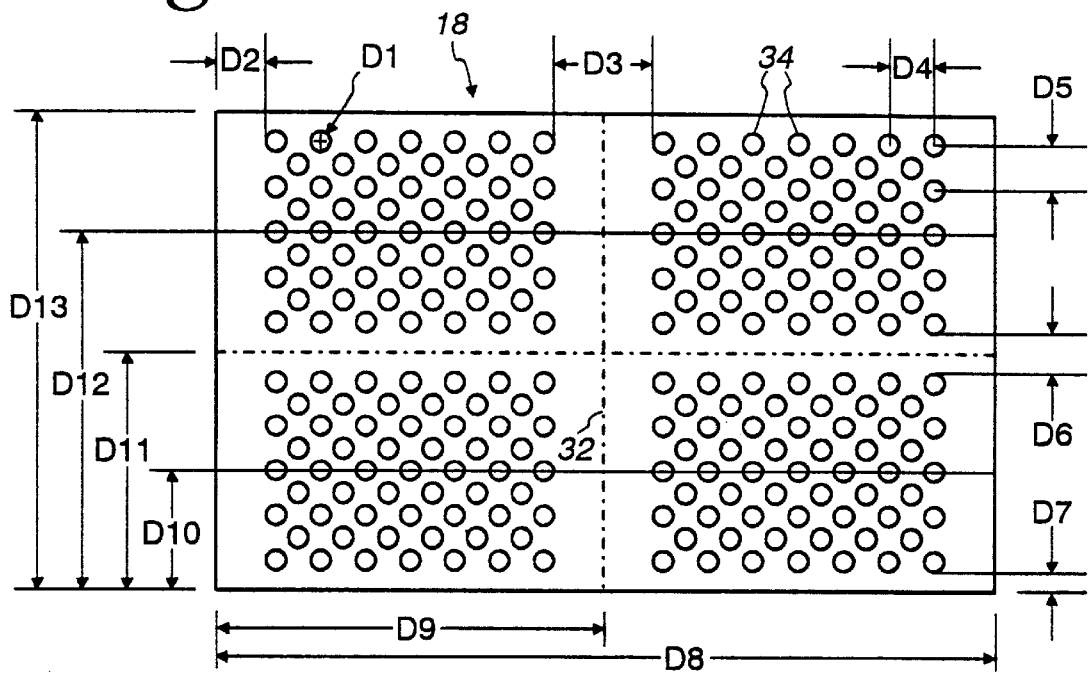
FIG. 2 is an enlarged plan view of an expanded cell showing the approximate location of a plurality of apertures formed in the cell wall.

As shown in FIG. 2, the cellular confinement structure has an open area due to the plurality of apertures 34. The area of the apertures 34 is between about 19% and about 28% of the total area of the cell wall 18. If the cell depth of the cell web is deeper, the area percentage of the apertures relative to the total area of the cell wall 18 will increase. All the cell walls (panels) 18 do not have to be open (contain a plurality of apertures). If aesthetics is a concern, non-open panels can be used by simply welding the non-open panels to the open panels 18 that contain a plurality of apertures 34. The panels 18 could also all be open in operations such as road building.

The diameter, D1, of the apertures 34 of FIG. 2 is between about 3 mm and about 17 mm, with the optimal size being approximately 10 mm. The plurality of apertures 34 are approximately located in the pattern shown in FIG. 2. The approximate optimal dimensions in inches for the aperture pattern are as follows: D2 (0.8125) is the horizontal distance between the edge of the cell wall 18 and the first aperture 34; D3 (1.6250) is the horizontal distance between the apertures 34 closest to and on opposite sides of the non-pair bonding area 32; D4 (0.7500) is the horizontal distance between individual apertures 34 measured from their centers; D5 (0.7500) is the vertical distance between individual apertures 34 measured from their centers; D6 (0.6250) is the vertical distance between the apertures 34 located at the middle of the cell wall; D7 (0.3125) is the vertical distance taken from the bottom of the cell wall to the first aperture 34; D8 (13.000) is the horizontal dimension of the cell wall 18; D9 (6.500) is the vertical distance from the vertical edge of the cell wall to the non-pair bonding area 32; D10 (2.000) is the vertical distance from the bottom of the cell to the middle of the third row of apertures 34 from the bottom; D11 (4.000) is the vertical distance between the bottom of the cell wall 18 and the middle of the cell wall 18; D12 (6.000) is the vertical distance between the bottom of the cell wall 13 to the middle of the third row of apertures 34 from the top; D13 (8.000) is the vertical dimension of the cell wall 18.

This pattern allows for optimum open area for stone infill interlock while still maintaining sufficient wall stiffness for construction site infilling. The staggering of the plurality of apertures decreases the column strength of the confinement structure to a lesser degree than if the apertures were not staggered. The pattern as show in FIG. 2 also contains non-open areas 32 that should remain non-open in order to bond the plastic strips together in a proper manner. The aperture pattern in FIG. 2 will vary as to the individual cell depth. The cellular confinement structure preferably does not contain half holes, thereby resulting results in smoother edges that reduce the danger when installing the confinement structure.

Figure 3:
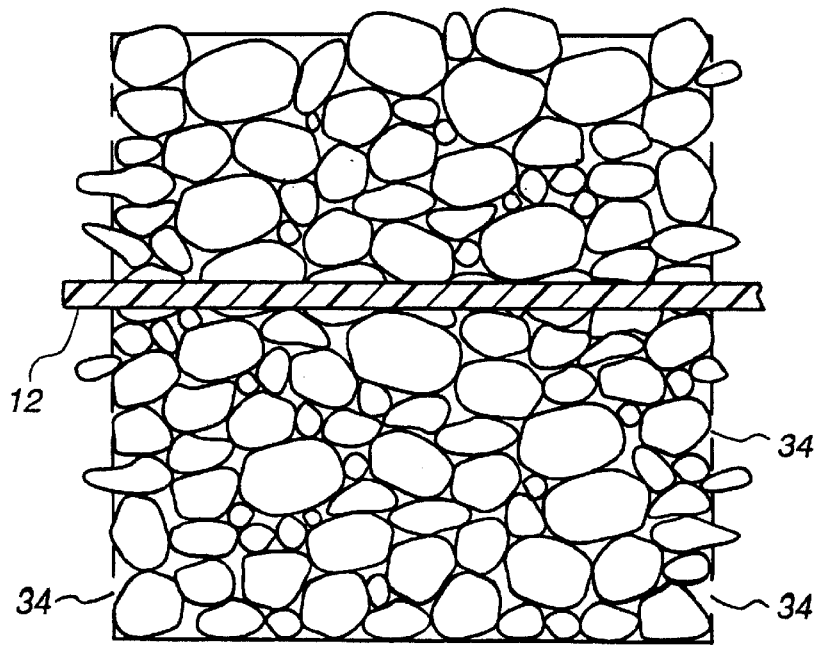
FIG. 3 is an enlarged sectional view taken along line 3—3 in FIG. 1 in which construction materials, such as stone, are lodged into the plurality of apertures.

As shown in FIG. 3, construction materials, such as stones having diameters in excess of the apertures, lodge into the plurality of apertures 34. A tendon 12, along with the apertures 34, are also shown in FIG. 3 with the stones. Stones have a very high internal friction angle which can vary between about 30 degrees and about 46 degrees. As used herein, the "internal friction angle" is defined as the friction angle of stones stacked on other stones, without the use of any confinement structure, such as a Geowebe. Since stones lack a cohesion factor, they must be confined in order to function properly. The cellular confinement structure provides this cohesion factor, but the interface friction angle is reduced because the confinement structure introduces a slip plane. As used herein, the "interface friction angle" is defined as the friction angle between the infill, such as stone, and the surface of the cell wall.

When the stone infill lodges into the apertures 34, the interface friction angle is increased which results in the improvement of the load bearing capacity. U.S. Pat. No. 4,965,097 to Gary Bach, which is incorporated herein by reference, describes the improvement of the interface friction angle for a sand infill. Using similar logic, the distribution of stones lodging in the plurality of apertures 34 assists in reducing long term settlement by making it difficult for the stones to move relative to each other. If the long term settlement is reduced, the load bearing capacity is then increased.

For example, if a stone has an internal friction angle of 39 degrees and is confined in a cellular confinement structure without a plurality of the above described apertures 34, the interface friction angle can be reduced to about 32 degrees. The addition of the improved cellular confinement structure with the plurality of apertures 34 in the pattern shown in FIG. 2 improves the interface friction angle by approximately 5 degrees to about 37 degrees.

The increased load bearing capacity along with the increased interface friction angle are shown in FIGS. 4–6. In FIG. 4, the load bearing capacity of the cellular confinement structure 44 without a plurality of apertures is shown. The cellular confinement structure is located below the wheel load 36 in FIG. 4, but above the soft subgrade 38, in which a resultant force 40 is exerted by the wheel load 36. Construction material, such as stones 42, preferably fill the entire the confinement system.

FIG. 5 also shows load bearing capacity but with the cellular confinement structure 10 using the plurality of apertures 34 as described above. The cellular confinement structure is located below the wheel load 36 in FIG. 5, but above the soft subgrade 38 in which a resultant force 46 is exerted by the wheel load 36. Construction material, such as stones 42, preferably fill the entire confinement system with the stones 42 filling in the plurality of apertures 34.

FIG. 6 shows the resulting interface friction angle using force vector 100 from cellular confinement structure 10 with a plurality of apertures 34, while force vector 200 is from the cellular confinement structure 44 without a plurality of apertures. The resultant force vector in FIG. 6 shows about a 5 degree increase in the interface friction angle with the use of the cellular confinement structure 10. The same approximate 5 degree increase in the interface friction angle is shown by the use of force vector 300 from the confinement structure 44 without apertures and the force vector 400 from the confinement structure 10 with the plurality of apertures 34.

The cell webs can be installed by manually expanding the web in a direction perpendicular to the faces of the strips 14 of the web and infilling the cells with concrete or earth material. When the reinforced cell webs are infilled with earth material, the webs can also be installed through the use of an installation frame as described in U.S. Pat. No. 4,717,283 to Gary Bach which is incorporated herein by reference. The cell web is secured to the installation frame to maintain the web in expanded form. The frame is rotated such that the web rests on the installation surface. Before the frame is removed, the tendons 12 may be internally or externally anchored to the surface. The cells 20 are then infilled with construction material to maintain the cell web in its expanded configuration. Some examples of such construction material are stone, gravel, concrete, asphalt, rounded rock and the like. If a tendon 12 is used with the cellular confinement structure, the construction materials exert forces on the top surface of the tendon 12 spanning between the cells to anchor the web.

The cell material is preferably made from sheet extruded polyethylene of 50 mil thickness. Carbon black may be included in the plastic to help prevent ultraviolet degradation of the web material when exposed to sunlight. The faces of the plastic strips 14 of cell material may also have textured surfaces as disclosed in U.S. Pat. No. 4,965,097 to Gary Bach which was previously incorporated herein by reference. The cell webs may also include notches which allow adjoining layers of cell webs to overlap along their edges to improve the stackability of the webs in forming earth retaining structures as described in U.S. Pat. No. 4,778,309 to Bach et al, which is incorporated herein by reference.

The plastic strips 14 may be bonded together by a number of methods known in the art. The preferred method of ultrasonic welding is accomplished using the process and apparatus disclosed in U.S. Pat. No. 4,647,325 to Gary Bach which is incorporated herein by reference. The bond is formed as groups of welding tips simultaneously contact the strips 14 to form a weld substantially traversing the entire width of the strips 14.

The apertures 34 may be formed in the strips 14 by a number of methods known in the art either before or after the strips are bonded together. Preferably, the apertures are formed by an on-line punching operation. Another method for forming the apertures is by drilling through a collapsed cell web to form a set of substantially coincident apertures through the web. A suitable length of tendon 12, if used, is then guided through any of the apertures 34 which are substantially coincident. As the cell web is then fully expanded, the tendon 12 is positioned within the cells and is folded vertically between adjacent cell walls as the cell web is re-collapsed. The reinforced cell material is then palletized and shipped for installation. Alternatively, the tendons 12, if used, may be guided through the apertures 34 at the installation site.

The web materials may be manufactured to result in webs of any dimension, but are typically three to eight feet wide and eight to twenty feet in length when stretched out for use. In the preferred embodiment, each plastic strip 14 is eight inches wide. The bonding areas 16 are about thirteen inches apart on each strip, as are the non-pair bonding areas 32. Each cell wall 18 comprises a section of the plastic strip about thirteen inches in length, between adjacent bonding areas 16 and between, non-pair bonding areas 32. The tail 30 is about one inch in length.

While the present invention has been described with reference to one or more particular embodiments, those skilled in the art will recognize that many changes may be made thereto without departing from the spirit and scope of the present invention. Each of these embodiments and obvious variations thereof are contemplated as falling within the spirit and scope of the claimed invention, which is set forth in the following claims.

We claim:

1. A cell structure for use in combination with confinement material of stones, said cell structure comprising:

a plurality of elongated plastic strips in a side by side relationship bonded together in spaced-apart, limited areas, wherein said plurality of strips are capable of being stretched in width to form a unitary web of cells; and said strips forming walls of said cells with at least one of said cell walls having a plurality of apertures, wherein the total area of said apertures in said at least one of said cell walls is between about 19% and about 28% of the area of said at least one of said cell walls, wherein the diameter of each of said apertures is between about 3 mm and 17 mm and the diameters of said stones exceed the diameter of said apertures, to permit said stones filling said cells to become lodged in said apertures to thereby increase load bearing capacity of the cell structure, and wherein said cell walls have a wall thickness sufficient to permit load bearing of the cell structure without collapse of the cell structure.

2. The cell structure of claim 1 wherein each cell wall has a plurality of apertures.

3. The cell structure of claim 1 wherein said diameter of each of said apertures is about 10 mm.

4. The cell structure of claim 1 wherein said apertures are aligned in rows.

5. The cell structure of claim 4 wherein said rows are staggered.

6. The cell structure of claim 8 further comprising reinforcing means including a tendon comprised of a material having a nominal breaking strength of about 100 to about 2,500 lb.

* * * * *

UNITED STATES PATENT AND TRADEMARK OFFICE
CERTIFICATE OF CORRECTION

| | |
|---|---|
| PATENT NO. | : 6,296,924 B1 |
| DATED | : October 2, 2001 |
| INVENTOR(S) | : Gary M. Bach |

It is certified that error appears in the above-identified patent and that said Letters Patent is hereby corrected as shown below:

<u>Column 8, claim 6,</u>
Line 17, change "8" to -- 1 --

Signed and Sealed this

Sixteenth Day of April, 2002

*Attest:*

JAMES E. ROGAN
*Attesting Officer*     *Director of the United States Patent and Trademark Office*